(No Model.)
F. WESTWOOD.
CRANK FOR VELOCIPEDES.
No. 476,911. Patented June 14, 1892.
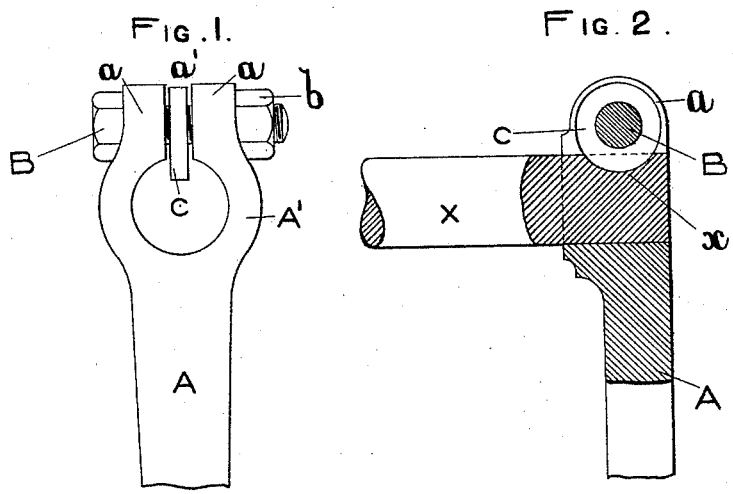
WITNESSES.
Will. Hoy. James.
G. S. Clark.
INVENTOR.
Frederick Westwood.
per
Robt. Ed. Phillips.
Attorney.

UNITED STATES PATENT OFFICE.

FREDERICK WESTWOOD, OF BIRMINGHAM, ENGLAND.

CRANK FOR VELOCIPEDES.

SPECIFICATION forming part of Letters Patent No. 476,911, dated June 14, 1892.

Application filed February 9, 1892. Serial No. 420,868. (No model.) Patented in England July 3, 1891, No. 11,284.

*To all whom it may concern:*

Be it known that I, FREDERICK WESTWOOD, a subject of the Queen of Great Britain, residing at Birmingham, in the county of Warwick, England, have invented a new and useful Improvement in Cranks for Velocipedes, (for which I have obtained a patent in Great Britain, No. 11,284, bearing date of July 3, 1891,) of which the following is a specification.

My invention relates to an improved detachable crank for use on velocipedes; and it consists of a crank having a split boss adapted to be drawn together by a transverse screw or bolt, and of a semicircular key carried by the said boss and protruding into the eye thereof, so that it engages with a semicircular keyway or groove cut or formed in the axle to which the crank is to be fixed, the object being to obtain a simple and efficient detachable crank, easy of manufacture, and not liable to get out of order from constant use. I attain this end in the manner illustrated by the accompanying drawings, in which—

Figure 1 is a broken view, in side elevation, of one form of my improved detachable crank, and Fig. 2 is a broken view, in sectional elevation, thereof.

The crank A, which is of the usual construction, has its boss A' split, and has two lugs or ears $a$ $a$, one on each side of the said split, the slot formed by and between the two lugs or ears $a$ $a$ being marked in the accompanying drawings $a'$. Through these lugs or ears a screw or bolt B passes, the said bolt passing freely through one of the said lugs or ears and screwing into the other, so as to draw the two together, and so contract the eye of the boss of the crank, and thus cause it to grip the axle X. To lock the bolt, a lock-nut $b$ is screwed onto its free end. In the slot $a'$, formed by and between the two lugs or ears $a$ $a$, is placed a flat key C, protruding into the eye of the boss A' of the crank in semicircular form, and of such a size that the bolt B passes through it. In the axle X is cut a keyway $x$ of semicircular form in longitudinal section, adapted to receive the semicircular key C.

To fix the crank on the axle, the key C is removed from the slot $a'$ to allow the crank to be passed onto the axle. The key C is then passed down into the slot $a'$ until it fits in the keyway $x$ in the axle. The bolt B is then screwed into the lugs or ears $a$ $a$, passing through a hole in the key C and tightened up, which clamps the boss of the crank onto the axle, and at the same time forces the key C down into the keyway $x$.

What I claim is—

The combination, with an axle the end of which is provided with a round-bottomed keyway, of a crank-hub provided with a slot and a boss on each side of the slot, a circular key in the slot and projecting therefrom into the said keyway, and a bolt passing through the said bosses and through the key, whereby all the said parts are securely clamped together, substantially as set forth.

FREDERICK WESTWOOD.

Witnesses:
HERBERT FRANK BEAMISH,
FREDERICK HALE.